United States Patent
Rapaka et al.

(10) Patent No.: US 10,484,721 B2
(45) Date of Patent: Nov. 19, 2019

(54) METHOD FOR MOTION ESTIMATION OF NON-NATURAL VIDEO DATA

(71) Applicant: QUALCOMM Incorporated, San Diego, CA (US)

(72) Inventors: Krishnakanth Rapaka, San Diego, CA (US); Joel Sole Rojals, La Jolla, CA (US); Li Zhang, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 99 days.

(21) Appl. No.: 14/659,122

(22) Filed: Mar. 16, 2015

(65) Prior Publication Data
US 2015/0264387 A1  Sep. 17, 2015

Related U.S. Application Data

(60) Provisional application No. 61/954,296, filed on Mar. 17, 2014.

(51) Int. Cl.
*H04N 19/96* (2014.01)
*H04N 19/56* (2014.01)
(Continued)

(52) U.S. Cl.
CPC .......... *H04N 19/96* (2014.11); *H04N 19/198* (2014.11); *H04N 19/52* (2014.11); *H04N 19/53* (2014.11);
(Continued)

(58) Field of Classification Search
None
See application file for complete search history.

(56) References Cited

U.S. PATENT DOCUMENTS 7,551,673 B1 * 6/2009 Oh .................. H04N 19/56
 348/413.1
7,852,940 B2  12/2010 Malayath
(Continued)

FOREIGN PATENT DOCUMENTS

EP  2046047 A1  4/2009
FR  2046047 A1 * 4/2009 ............. H04N 19/56
(Continued)

OTHER PUBLICATIONS

Lee, Sangkeun, "Fast Motion Estimation based on Adaptive Search Range Adjustment and Matching Error Prediction", IEEE Transactions on Consumer Electronics, vol. 55, No. 2, pp. 805-811 (May 2009).*
(Continued)

*Primary Examiner* — Lindsay J Uhl
(74) *Attorney, Agent, or Firm* — Shumaker & Sieffert, P.A.

(57) ABSTRACT

A method for motion estimation for screen and non-natural content coding is disclosed. In one aspect, the method may include selecting a candidate block of a first frame of the video data for matching with a current block of a second frame of the video data, calculating a first partial matching cost for matching a first subset of samples of the candidate block to the current block, and determining whether the candidate block has a lowest matching cost with the current block based at least in part on the first partial matching cost.

30 Claims, 9 Drawing Sheets

(51) Int. Cl.
*H04N 19/557* (2014.01)
*H04N 19/52* (2014.01)
*H04N 19/53* (2014.01)
*H04N 19/57* (2014.01)
*H04N 19/196* (2014.01)
*H04N 19/567* (2014.01)

(52) U.S. Cl.
CPC ........... *H04N 19/557* (2014.11); *H04N 19/56* (2014.11); *H04N 19/57* (2014.11); *H04N 19/567* (2014.11)

(56) References Cited

U.S. PATENT DOCUMENTS

| | | | | |
|---|---|---|---|---|
| 8,000,392 B1* | 8/2011 | Krupiczka | ............ | H04N 19/56 375/240.12 |
| 2002/0025001 A1* | 2/2002 | Ismaeil | ................. | H04N 19/56 375/240.16 |
| 2004/0156435 A1 | 8/2004 | Itoh et al. | | |
| 2006/0245497 A1 | 11/2006 | Tourapis et al. | | |
| 2008/0273597 A1* | 11/2008 | Kovalenko | ............ | H04N 19/56 375/240.16 |
| 2011/0103482 A1* | 5/2011 | Lee | ........................ | H04N 19/56 375/240.16 |
| 2013/0094567 A1* | 4/2013 | Amitay | ................... | G09G 5/39 375/240.2 |

FOREIGN PATENT DOCUMENTS

| | | |
|---|---|---|
| JP | 2006254454 A | 9/2006 |
| JP | 2006270958 A | 10/2006 |
| JP | 2009526436 A | 7/2009 |
| KR | 20090079286 A | 7/2009 |
| WO | WO-07048129 | 4/2007 |

OTHER PUBLICATIONS

Cheung, C., et al., "Normalized Partial Distortion Search Algorithm for Block Motion Estimation", IEEE Transactions on Circuits and Systems for Video Technology, vol. 10, No. 3, pp. 417-422 (Apr. 2000).*
Kim, J., et al., "Early Determination of Mode Decision for HEVC", 2012 Picture Coding Symposium, May 7-9, 2012, Krakow, Poland, pp. 449-452 (2012).*
Cheung, C., et al., "Normalized Partial Distortion Search Algorithm for Block Motion Estimation", IEEE Transactions on Circuits and Systems for Video Technology, vol. 10, No. 3, pp. 417-422 (Apr. 2000) (Year: 2000).*
Gallant, M., et al., "An Efficient Computation-Constrained Block-Based Motion Estimation Algorithm for Low Bit Rate Video Coding", Conference Record of Thirty-Second Asilomar Conference on Signals, Systems, and Computers, IEEE (1998) (Year: 1998).*
Lee, Sangkeun, "Fast Motion Estimation based on Adaptive Search Range Adjustment and Matching Error Prediction", IEEE Transactions on Consumer Electronics, vol. 55, No. 2, pp. 805-811 (May 2009) (Year: 2009).*
Kim, J., et al., "Early Determination of Mode Decision for HEVC", 2012 Picture Coding Symposium, May 7-9, 2012, Krakow, Poland, pp. 449-452 (2012) (Year: 2012).*
Lee, Sangkeun, "Fast Motion Estimation based on Adaptive Search Range Adjustment and Matching Error Prediction", IEEE Transactions on Consumer Electronics, vol. 55, No. 2 (May 2009) (Year: 2009).*
International Search Report and Written Opinion—PCT/US2015/020940—ISA/EPO—dated Sep. 2, 2015.
Rapaka K et al., "AhG8: On fast inter search method for screen content coding", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16 ); URL: http://wftp3.1tu.int/av-arch/jctvc-site/, no. JCTVC-Q0147-v3, Mar. 30, 2014 (Mar. 30, 2014); 5 pages, XP030116082.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
Itu-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Itu-T H.263, "Video Coding for Low Bit Rate Communication", Series H: Audiovisual and Multimedia Systems, Infrastructure of audiovisual services—Coding of moving video, Jan. 2005, 226 pp.
Response to Second Written Opinion dated May 2, 2016, from International Application No. PCT/US2015/020940, dated May 31, 2016, 13 pp.
International Preliminary Report on Patentability from International Application No. PCT/US20151020940, dated Jun. 20, 2016, 11 pp.
Response to Written Opinion dated Sep. 2, 2015, from International Application No. PCT/U52015/020940, filed Jan. 14, 2016, 12 pp.
Second Written Opinion dated May 2, 2016, from International Application No. PCT/U52015/020940, 8 pp.

* cited by examiner

METHOD FOR MOTION ESTIMATION OF NON-NATURAL VIDEO DATA

INCORPORATION BY REFERENCE TO PRIORITY APPLICATION(S)

This application claims the benefit of U.S. Provisional Application No. 61/954,296, filed Mar. 17, 2014.

BACKGROUND

Technical Field

This disclosure relates to the field of video coding and compression, and particularly to methods for motion estimation of non-natural video content.

Description of the Related Art

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by Moving Picture Experts Group-2 (MPEG-2), MPEG-4, International Telegraph Union-Telecommunication Standardization Sector (ITU-T) H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

A large portion of the resources used in video coding are allocated to motion estimation. Motion estimation typically includes assigning motion vectors to indicate the movement of pixels or blocks between two images in video data. Motion estimation may include a determination of an error or a difference between two respective blocks of the images and selecting the blocks as matching each other when the blocks have a minimum error or a minimum difference between the two respective blocks. The efficiency of video coding algorithms can thus be improved by reducing the computational complexity of motion estimation.

SUMMARY

The systems, methods and devices of this disclosure each have several innovative aspects, no single one of which is solely responsible for the desirable attributes disclosed herein.

In one aspect, a method for motion estimation of non-natural video data comprises selecting a candidate block of a first frame of the video data for matching with a current block of a second frame of the video data; calculating a first partial matching cost for matching a first subset of samples of the candidate block to the current block; and determining whether the candidate block has a lowest matching cost with the current block based at least in part on the first partial matching cost.

In another aspect, a device for motion estimation of non-natural video data comprises a memory configured to store the video data; and a processor in communication with the memory and configured to: select a candidate block of a first frame of the video data for matching with a current block of a second frame of the video data; calculate a first partial matching cost for matching a first subset of samples of the candidate block to the current block; and determine whether the candidate block has a lowest matching cost with the current block based at least in part on the first partial matching cost.

In another aspect, there is provided an apparatus comprising means for selecting a candidate block of a first frame of the video data for matching with a current block of a second frame of the video data; means for calculating a first partial matching cost for matching a first subset of samples of the candidate block to the current block; and means for determining whether the candidate block has a lowest matching cost with the current block based at least in part on the first partial matching cost.

In yet another aspect, there is provided a non-transitory computer readable storage medium having stored thereon instructions that, when executed, causes a processor of a device to select a candidate block of a first frame of the video data for matching with a current block of a second frame of the video data; calculate a first partial matching cost for matching a first subset of samples of the candidate block to the current block; and determine whether the candidate block has a lowest matching cost with the current block based at least in part on the first partial matching cost.

DETAILED DESCRIPTION

Figure 1A:
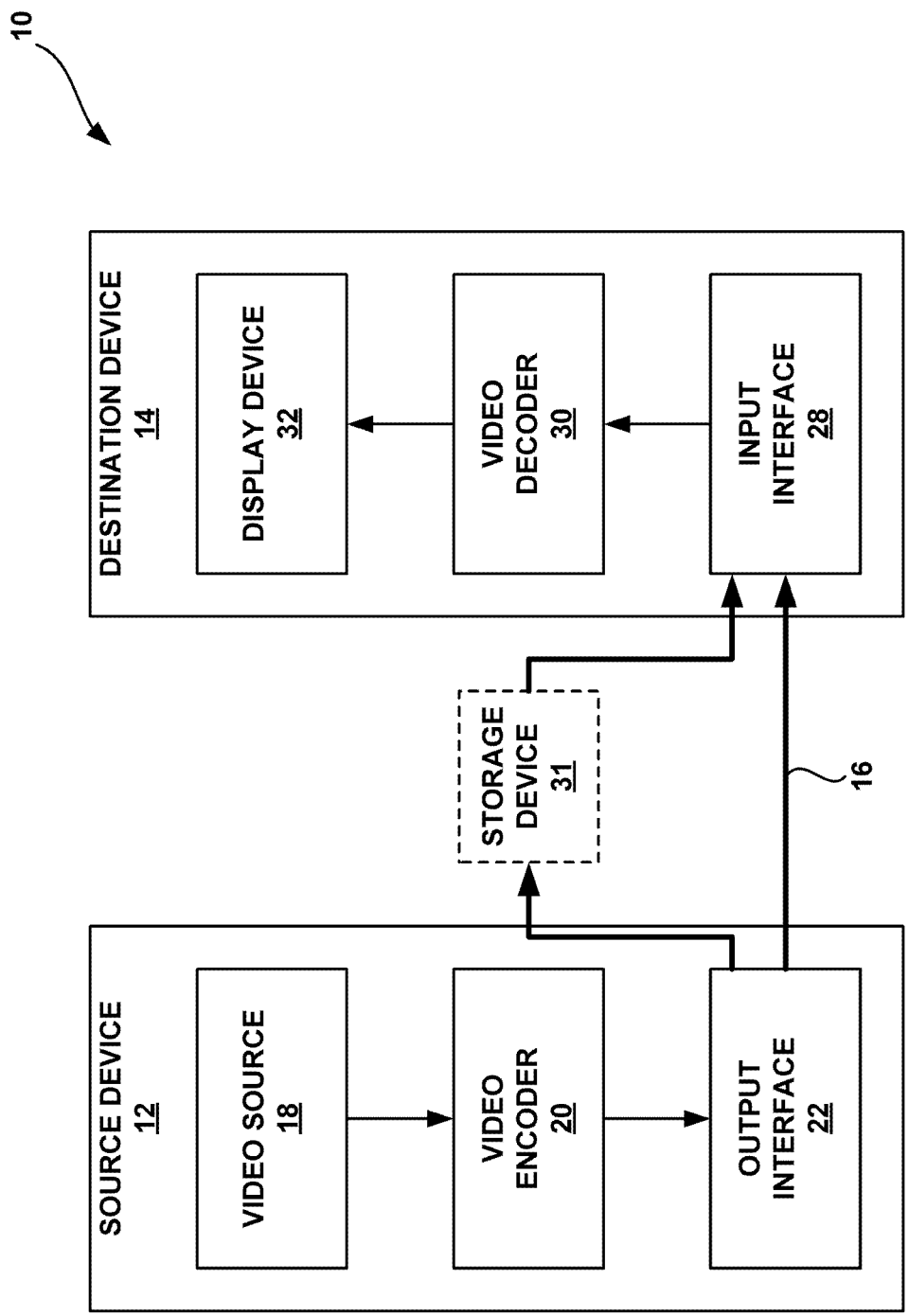
FIG. 1A is a block diagram illustrating an example video encoding and decoding system that may utilize techniques in accordance with aspects described in this disclosure.

In general, this disclosure relates to methods for motion estimation of non-natural video data. Motion estimation typically includes assigning motion vectors to indicate the movement of pixels or blocks between two images in video data. Motion estimation may include the determination of an error or a difference between two respective blocks of the images and selecting the blocks as matching each other when the blocks have a minimum error or minimal difference between the two respective blocks. Conventional motion estimation may be based on certain assumptions associated with the type of content of the video data. For example, "natural" video data, e.g., video data captured through a camera having an optical system, may be relatively smooth due to the nature of the subjects of the captured video data and the noise introduced by the optical system. As used herein, the term "smooth" generally refers to an image that does not have sharp transitions between pixels, i.e., the change in color between pixels is relatively gradual. Accordingly, conventional motion estimation may assume that the error associated with candidate blocks decreases as the candidate block having the lowest error, i.e., the best match candidate block, is approached. As used herein, a candidate block generally refers to a block of a first frame of the video data that is compared with a current block of a second frame of the video data to determine if the candidate block matches the current block. Typically, a set of candidate blocks are searched to determine the best match candidate block out of the set of candidate blocks. However, these assumptions do not necessarily hold true for "non-natural" video data. Non-natural video data may generally refer to computer generated video data such as, but not limited to, screen content and/or text heavy video data. In non-natural video data, the error associated with candidate blocks may not decrease as the best match candidate block is approached. As such, the motion estimation techniques designed for natural video data may not be efficient for motion estimation of non-natural video data.

Certain embodiments of this disclosure address the above-indicated issues that conventional motion estimation may introduce when applied to non-natural video data. For example, in non-natural video data a large portion of the error for matching a candidate block to a current block may be concentrated on a few samples of the candidate block. Thus, in at least one embodiment, a multi-stage approximated error cost computation with an early exit mechanism is implemented by approximating the error based on only a few samples of the candidate block. In another embodiment, a modified initial search is performed in a moving diamond pattern since in non-natural video data, the error associated with candidate blocks may not decrease as the best match candidate block is approached. In yet another embodiment, a modified early skip detection is performed since the conventional tests may be too aggressive for non-natural video data. Thus, according to at least one embodiment, fast motion estimation can be implemented for non-natural video with an improved speed and efficiency compared to the conventional method.

In the description below, H.264/Advanced Video Coding (AVC) techniques related to certain embodiments are described; the HEVC standard and related techniques are also discussed. While certain embodiments are described herein in the context of the HEVC and/or H.264 standards, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including the range extension.

HEVC generally follows the framework of previous video coding standards in many respects. The unit of prediction in HEVC is different from the units of prediction (e.g., macroblocks) in certain previous video coding standards. In fact, the concept of a macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), and HEVC including the range extension.

In addition, a video coding standard, namely HEVC, has been developed by the Joint Collaboration Team on Video Coding (JCT-VC) of ITU-T Video Coding Experts Group (VCEG) and ISO/IEC MPEG. The full citation for HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The range extension to HEVC is also being developed by the JCT-VC.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
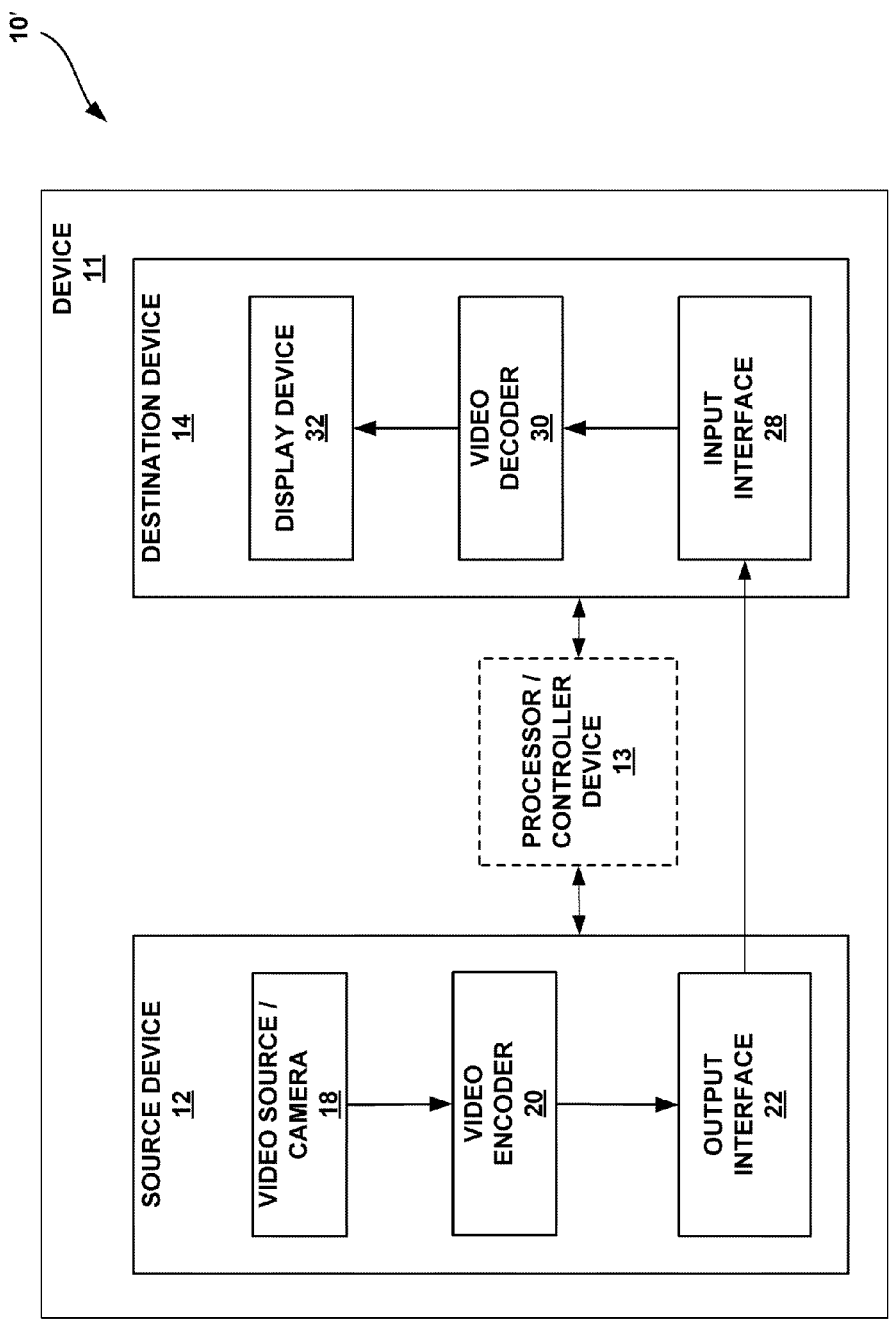
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to a storage device 31 (optionally present). Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network (WLAN) connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2 or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated FIG. 3 or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a controller/processor device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as HEVC, and may conform to a HEVC Test Model (HM). Alternatively, the video encoder 20 and the video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include video parameter sets (VPS), sequence parameter sets (SPSs), picture parameter sets (PPSs), adaptation parameter sets (APSs), and other syntax structures. An SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate a coded picture, the video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). The video encoder 20 may use quadtree partitioning to partition the video blocks of treeblocks into video blocks associated with CUs, hence the name "treeblocks."

In some examples, the video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

To generate a coded slice, the video encoder 20 may perform encoding operations on each treeblock in a slice. When the video encoder 20 performs an encoding operation on a treeblock, the video encoder 20 may generate a coded treeblock. The coded treeblock may comprise data representing an encoded version of the treeblock.

When the video encoder 20 generates a coded slice, the video encoder 20 may perform encoding operations on (e.g., encode) the treeblocks in the slice according to a raster scan order. For example, the video encoder 20 may encode the treeblocks of the slice in an order that proceeds from left to right across a topmost row of treeblocks in the slice, then from left to right across a next lower row of treeblocks, and so on until the video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, the video encoder 20 may be able to access information generated by encoding treeblocks above and to the left of the given treeblock when encoding the given treeblock. However, the video encoder 20 may be unable to access information generated by encoding treeblocks below and to the right of the given treeblock when encoding the given treeblock.

To generate a coded treeblock, the video encoder 20 may recursively perform quadtree partitioning on the video block of the treeblock to divide the video block into progressively smaller video blocks. Each of the smaller video blocks may be associated with a different CU. For example, the video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times the video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

The video encoder 20 may perform encoding operations on (e.g., encode) each CU of a treeblock according to a z-scan order. In other words, the video encoder 20 may encode a top-left CU, a top-right CU, a bottom-left CU, and then a bottom-right CU, in that order. When the video encoder 20 performs an encoding operation on a partitioned CU, the video encoder 20 may encode CUs associated with sub-blocks of the video block of the partitioned CU according to the z-scan order. In other words, the video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, the video encoder 20 may be able to access information generated by encoding some CUs that neighbor the given CU when encoding the given CU. However, the video encoder 20 may be unable to access information generated by encoding other CUs that neighbor the given CU when encoding the given CU.

When the video encoder 20 encodes a non-partitioned CU, the video encoder 20 may generate one or more prediction units (PUs) for the CU. Each of the PUs of the CU may be associated with a different video block within the video block of the CU. The video encoder 20 may generate a predicted video block for each PU of the CU. The predicted video block of a PU may be a block of samples. The video encoder 20 may use intra prediction or inter prediction to generate the predicted video block for a PU.

When the video encoder 20 uses intra prediction to generate the predicted video block of a PU, the video encoder 20 may generate the predicted video block of the PU based on decoded samples of the picture associated with the PU. If the video encoder 20 uses intra prediction to generate predicted video blocks of the PUs of a CU, the CU is an intra-predicted CU. When the video encoder 20 uses inter prediction to generate the predicted video block of the PU, the video encoder 20 may generate the predicted video block of the PU based on decoded samples of one or more pictures other than the picture associated with the PU. If the video encoder 20 uses inter prediction to generate predicted video blocks of the PUs of a CU, the CU is an inter-predicted CU.

Furthermore, when the video encoder 20 uses inter prediction to generate a predicted video block for a PU, the video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. The video encoder 20 may generate the predicted video block for the PU based on the reference blocks of the PU.

After the video encoder 20 generates predicted video blocks for one or more PUs of a CU, the video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, the video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

The video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, the video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

The video encoder 20 may associate each CU with a quantization parameter (QP) value. The QP value associated with a CU may determine how the video encoder 20 quantizes transform coefficient blocks associated with the CU. The video encoder 20 may adjust the degree of quantization applied to the transform coefficient blocks associated with a CU by adjusting the QP value associated with the CU.

After the video encoder 20 quantizes a transform coefficient block, the video encoder 20 may generate sets of syntax elements that represent the transform coefficients in the quantized transform coefficient block. The video encoder 20 may apply entropy encoding operations, such as Context Adaptive Binary Arithmetic Coding (CABAC) operations, to some of these syntax elements. Other entropy coding techniques such as context-adaptive variable-length coding (CAVLC), probability interval partitioning entropy (PIPE) coding, or other binary arithmetic coding could also be used.

The bitstream generated by the video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, SEI, an access unit delimiter, filler data, or another type of data. The data in a NAL unit may include various syntax structures.

The video decoder 30 may receive the bitstream generated by the video encoder 20. The bitstream may include a coded representation of the video data encoded by the video encoder 20. When the video decoder 30 receives the bitstream, the video decoder 30 may perform a parsing operation on the bitstream. When the video decoder 30 performs the parsing operation, the video decoder 30 may extract syntax elements from the bitstream. The video decoder 30 may reconstruct the pictures of the video data based on the syntax elements extracted from the bitstream. The process to reconstruct the video data based on the syntax elements may be generally reciprocal to the process performed by the video encoder 20 to generate the syntax elements.

After the video decoder 30 extracts the syntax elements associated with a CU, the video decoder 30 may generate predicted video blocks for the PUs of the CU based on the syntax elements. In addition, the video decoder 30 may inverse quantize transform coefficient blocks associated with TUs of the CU. The video decoder 30 may perform inverse transforms on the transform coefficient blocks to reconstruct residual video blocks associated with the TUs of the CU. After generating the predicted video blocks and reconstructing the residual video blocks, the video decoder 30 may reconstruct the video block of the CU based on the predicted video blocks and the residual video blocks. In this way, the video decoder 30 may reconstruct the video blocks of CUs based on the syntax elements in the bitstream.

Video Encoder

Figure 2:
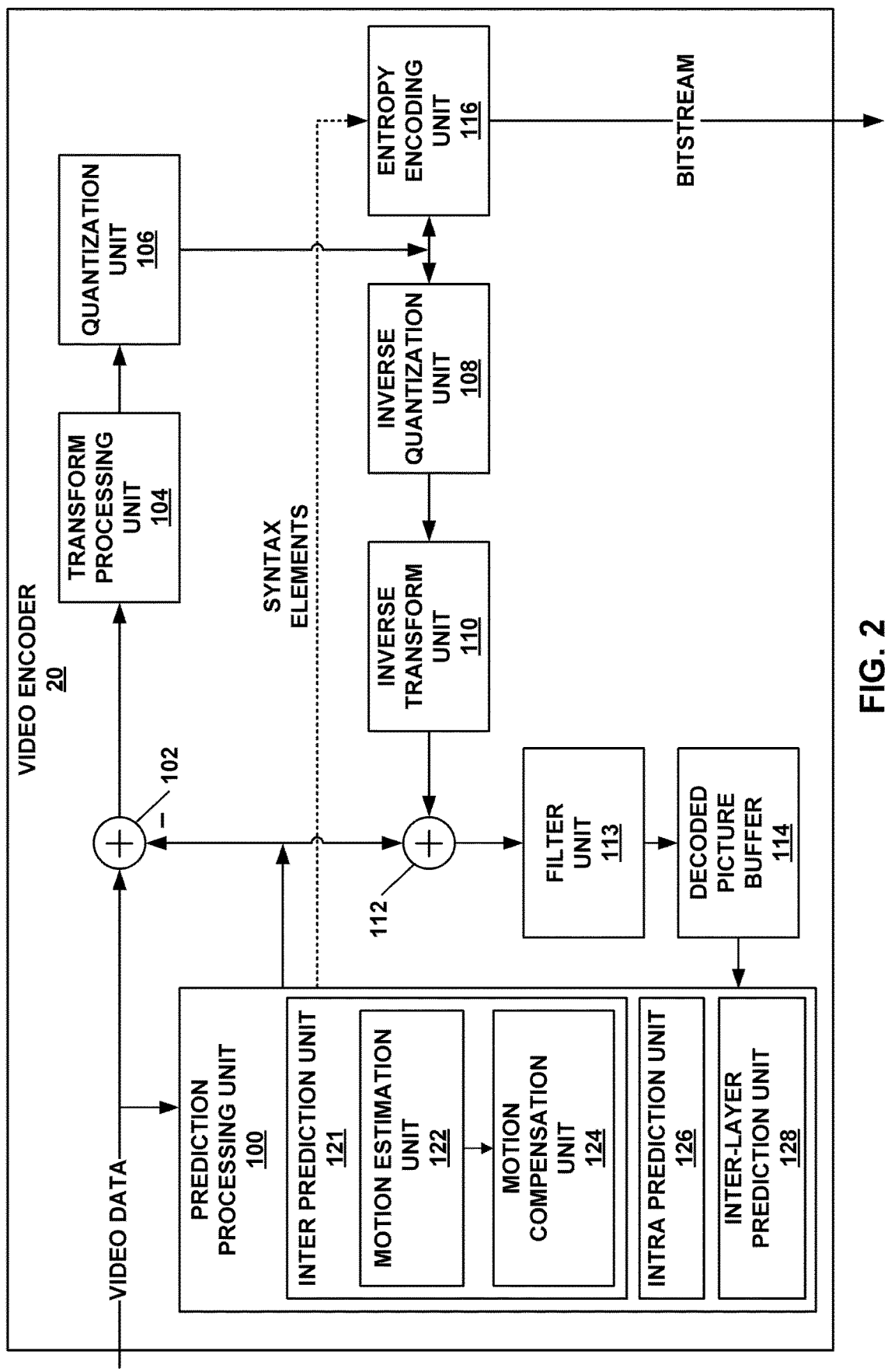
FIG. 2 is a block diagram illustrating an example of a video encoder that may implement techniques in accordance with aspects described in this disclosure.

FIG. 2 is a block diagram illustrating an example of the video encoder 20 that may implement techniques in accordance with aspects described in this disclosure. The video encoder 20 may be configured to process a single layer of a video frame, such as for HEVC. Further, the video encoder 20 may be configured to perform any or all of the techniques of this disclosure. In some examples, the techniques described in this disclosure may be shared among the various components of the video encoder 20. In some examples, additionally or alternatively, a processor (not shown) may be configured to perform any or all of the techniques described in this disclosure.

For purposes of explanation, this disclosure describes the video encoder 20 in the context of HEVC coding. However, the techniques of this disclosure may be applicable to other coding standards or methods. The example depicted in FIG. 2 is for a single layer codec. However, in certain embodiments, some or all of the video encoder 20 may be duplicated for processing of a multi-layer codec.

The video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2, the video encoder 20 includes a plurality of functional components. The functional components of the video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, the video encoder 20 may include more, fewer, or different functional components. Furthermore, motion estimation unit 122 and motion compensation unit 124 may be highly integrated, but are represented in the example of FIG. 2 separately for purposes of explanation.

The video encoder 20 may receive video data. The video encoder 20 may receive the video data from various sources. For example, the video encoder 20 may receive the video data from video source 18 (e.g., shown in FIG. 1A or 1B) or another source. The video data may represent a series of pictures. To encode the video data, the video encoder 20 may perform an encoding operation on each of the pictures. As part of performing the encoding operation on a picture, the video encoder 20 may perform encoding operations on each slice of the picture. As part of performing an encoding operation on a slice, the video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

The video encoder 20 may perform encoding operations on each non-partitioned CU of a treeblock. When the video encoder 20 performs an encoding operation on a non-partitioned CU, the video encoder 20 generates data representing an encoded representation of the non-partitioned CU.

As part of performing an encoding operation on a CU, prediction processing unit 100 may partition the video block of the CU among one or more PUs of the CU. The video encoder 20 and the video decoder 30 may support various PU sizes. Assuming that the size of a particular CU is 2N×2N, the video encoder 20 and the video decoder 30 may support PU sizes of 2N×2N or N×N, and inter-prediction in symmetric PU sizes of 2N×2N, 2N×N, N×2N, N×N, 2N×nU, nL×2N, nR×2N, or similar. The video encoder 20 and the video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to the video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. The video decoder 30 may use the motion vector of the indicated neighboring PU and the motion vector difference to determine the motion vector of the PU. By referring to the motion information of a first PU when signaling the motion information of a second PU, the video encoder 20 may be able to signal the motion information of the second PU using fewer bits.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SHVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

The video encoder 20 may associate a QP value with a CU in various ways. For example, the video encoder 20 may perform a rate-distortion analysis on a treeblock associated with the CU. In the rate-distortion analysis, the video encoder 20 may generate multiple coded representations of the treeblock by performing an encoding operation multiple times on the treeblock. The video encoder 20 may associate different QP values with the CU when the video encoder 20 generates different encoded representations of the treeblock. The video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, the video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of the video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, the video encoder 20 may perform a CAVLC operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Video Decoder

Figure 3:
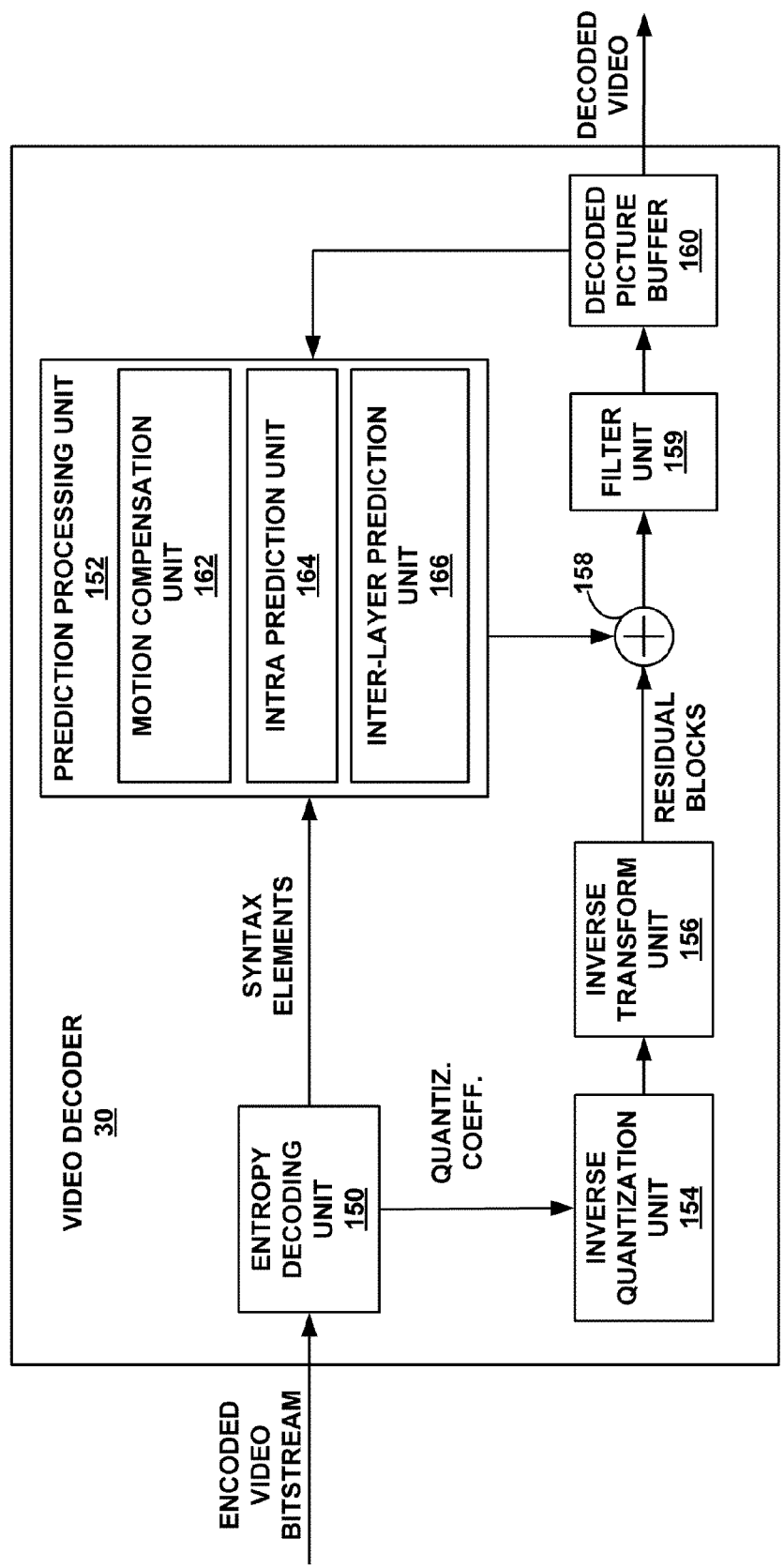
FIG. 3 is a block diagram illustrating an example of a video decoder that may implement techniques in accordance with aspects described in this disclosure.

FIG. 3 is a block diagram illustrating an example of the video decoder 30 that may implement techniques in accordance with aspects described in this disclosure. The video decoder 30 may be configured to process a single layer of a video frame, such as for HEVC. Further, the video decoder 30 may be configured to perform any or all of the techniques of this disclosure. In some examples, the techniques described in this disclosure may be shared among the various components of the video decoder 30. In some examples, additionally or alternatively, a processor (not shown) may be configured to perform any or all of the techniques described in this disclosure.

For purposes of explanation, this disclosure describes the video decoder 30 in the context of HEVC coding. However, the techniques of this disclosure may be applicable to other coding standards or methods. The example depicted in FIG. 3 is for a single layer codec. However, in certain implementations, some or all of the video decoder 30 may be duplicated for processing of a multi-layer codec.

In the example of FIG. 3, the video decoder 30 includes a plurality of functional components. The functional components of the video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, the video decoder 30 may perform a decoding pass generally reciprocal to the encoding pass described with respect to video encoder 20 of FIG. 2. In other examples, the video decoder 30 may include more, fewer, or different functional components.

The video decoder 30 may receive a bitstream that comprises encoded video data. The bitstream may include a plurality of syntax elements. When the video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, the video decoder 30 may perform a reconstruction operation on the non-partitioned CU. To perform the reconstruction operation on a non-partitioned CU, the video decoder 30 may perform a reconstruction operation on each TU of the CU. By performing the reconstruction operation for each TU of the CU, the video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by the video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from the video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by the video encoder 20 during generation of the predicted video block of the PU to calculate interpolated values for sub-integer samples of a reference block. Motion compensation unit 162 may determine the interpolation filters used by the video encoder 20 according to received syntax information and use the interpolation filters to produce the predicted video block.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, the video decoder 30 may also include inter-layer prediction unit 166. Inter-layer prediction unit 166 is configured to predict a current block (e.g., a current block in the enhancement layer) using one or more different layers that are available in SHVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra prediction data or inter-prediction data, as applicable, to reconstruct the video block of the CU. Thus, the video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, the video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, the video decoder 30 may perform, based on the video blocks in decoded picture buffer 160, intra prediction or inter prediction operations on PUs of other CUs.

Motion Estimation

Motion estimation is the process of determining motion vectors that describe the transformation from one 2D image to another; usually from a temporally previous frame in a video sequence. Motion vectors may relate to a whole image (referred to as global motion estimation) or may relate to specific portions of the image such as rectangular blocks, arbitrary shaped patches, or even per pixel. In exemplary embodiments, motion estimation and motion vectors are based on the blocks of the two images (also generally referred to as block matching). However, the described technology can be extended (i.e., applied) to any arbitrary shape within an image. Motion compensation can be performed on the two images based on the determined motion vectors. Motion compensation can be performed by applying the motion vectors to the previous image to synthesize a transformation to the next image. The combination of motion estimation and motion compensation is a key part of video compression as used by MPEG-1, MPEG-2, MPEG-4, H.264/AVC, HEVC as well as many other video codecs.

Block-based motion estimation that is used in computing motion vectors can be estimated by using block matching, which minimizes a measure of matching error. The matching error between a block (also referred to as a current block) at first position (x, y) in a current image, $I_t$, and a candidate block at position (x+u, y+v) in a reference image, $I_{t-1}$, can be calculated as a sum of absolute difference (SAD) between the current block and the candidate block.

In certain implementations, the current and candidate blocks have a block size of B×B pixels. For a block size of B×B, the SAD can be calculated as follows:

$$SAD_{(x,y)}(u, v) = \sum_{j=0}^{B-1}\sum_{i=0}^{B-1} |I_t(x, y) - I_{t-1}(x + u, y + v)|$$

Where B is the block size, $I_t$ is the current block, and $I_{t-1}$ is the candidate block.

A total cost can be calculated in consideration of the cost required to code the motion vectors into the bitstream. For example, the total cost of the candidate block matching the current block can be calculated by adding the bit cost required to code the motion vectors to the SAD as follows:

$$Cost_{(x,y)}(u, v) = \sum_{i=0}^{B-1}\sum_{i=0}^{B-1} |I_t(x, y) - I_{t-1}(x + u, y + v)| + \lambda * mvbits$$

In the above total cost calculation, $\lambda$ may be a constant value (based on the quantization parameter of the block) and mvbits may be the number of bits required to represent the motion vector in the encoded bitstream.

Motion estimation is one of the most expensive tools in a typical video encoder and can consume over 70-80% of the video encoder's resources. Accordingly, acceleration in motion estimation can have an appreciable effect of the overall efficiency of a video encoder. The techniques for accelerating motion estimation can generally be classified into three categories: a) reducing the search space, b) reducing the computational cost of the matching error for each search position, and c) combinations of the first two techniques. In reducing the search space, the obtained minimum of the matching error, e.g., the minimum SAD among the candidate blocks in the reduced search space, may only be a local minimum within the search space. In reducing the computational cost of the matching error for each search position, the type of computation and comparison used may determine whether the global minimum of the candidate blocks can be identified.

There exists a trade-off between the above-mentioned techniques when compared to a full search, i.e., brute force searching of all possible candidates. The specific trade-off obtained by implementing a motion acceleration technique depends on the characteristics of the video data, the motion distribution within the video data, and how the techniques are designed. One factor to take into consideration in designing motion estimation acceleration techniques is the trade-off between the complexity of executing the technique and the coding efficiency obtained by executing the technique.

Figure 4:
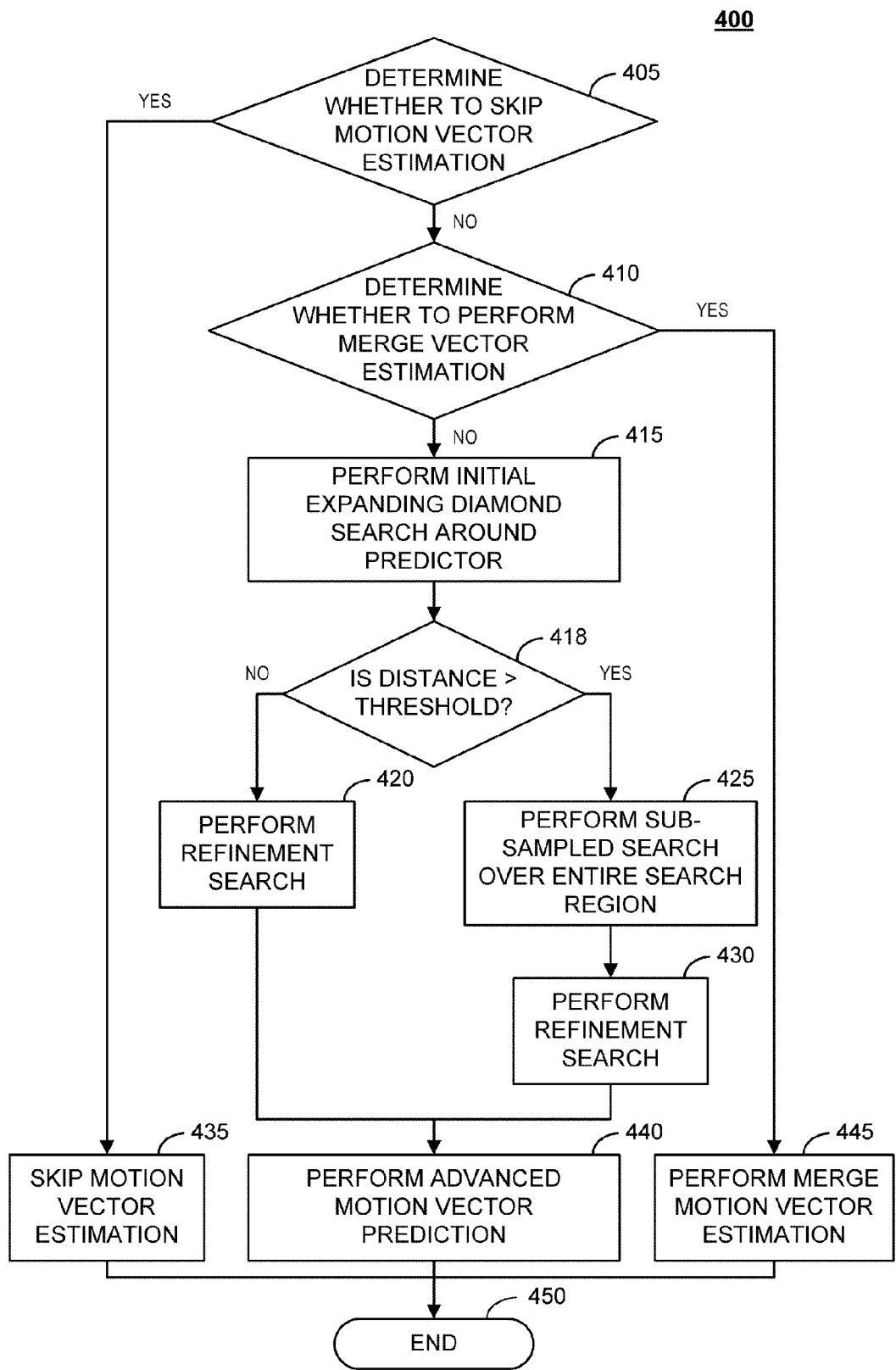
FIG. 4 is a flowchart illustrating a method for accelerated motion estimation in accordance with aspects described in this disclosure.

FIG. 4 is a flowchart illustrating a conventional method for accelerated motion estimation. The method 400 of FIG. 4 may be implemented by the HM range extension for motion estimation. Further, the method 400 of FIG. 4 was developed based on the assumption that the motion estimation is performed on natural video data. Accordingly, the method 400 was developed based on the assumption that the video data is smooth and that the error associated with candidate blocks decreases as the candidate block having the lowest error is approached. The steps illustrated in FIG. 4 may be performed by a video encoder (e.g., the video encoder 20) or any other component. For convenience, method 400 is described as performed by a video coder (also simply referred to as coder), which may be the video encoder 20, the video decoder 30, or another component.

The method 400 begins at decision block 405, where the coder determines whether to skip motion vector estimation. When the coder determines to skip motion estimation in step 405, the method 400 continues at block 435 where the coder skips motion estimation. The method ends at block 450. When the coder determines to perform motion estimation at decision block 405, the method continues to decision block 410. At decision block 410, the coder determines whether to perform merge motion vector estimation. When the coder determines to perform merge vector estimation, the method proceeds to block 445. At block 445, the coder performs merge motion vector estimation. When the coder determines, at block 410, not to perform merge motion vector estimation, the method 400 continues at block 415.

At block 415, the coder performs an initial search around a predictor. The predictor may be a candidate block that is predicted to be a match having the lowest matching cost or lowest total matching cost with the current block. The initial search is performed around the predictor on samples that are covered by an exponentially growing diamond centered on the predictor. When there is more than one predictor, the initial search may be performed for each predictor. The coder then determines whether the distance between the best match, i.e., the candidate block having the lowest matching cost or lowest total matching cost with the current block, to the current block is greater than the distance from the predictor to the current block. At decision block 418, the difference in the distances between the best match to the current block and the predictor to the current block are compared to a threshold. When the difference in the distances between the best match to the current block and the predictor to the current block is greater than the threshold, the method 400 continues at block 425. When the difference in the distances between the best match to the current block and the predictor to the current block is less than or equal to the threshold, the method 400 continues at block 420.

At block 420, the coder performs a refinement search. After the refinement search, the method proceeds to block 440 where the coder performs advanced motion vector prediction (AMVP). At block 425, the coder performs a sub-sampled search over the entire search region. At block 430, the coder performs a refinement search. After the refinement search, the method ends at block 440 where the coder performs AMVP. The method ends at block 450.

A number of fast motion estimation methods are designed for natural, camera-captured sequences. Natural video data may be smoother that non-natural video data due to the optical systems included in video cameras which attenuate higher frequencies and may also be noisier due to the noise introduced by lens distortion of the optical system. Fast motion estimation methods which are designed for natural video data may not perform well for non-natural content or non-natural video data (e.g., screen content, compound images etc.). Non-natural video as used herein generally refers to video data that has not been captured via an optical system but instead has been, for example, generated by a computer. Examples of non-natural video data include, but are not limited to, screen content, video data generated to interface with a computer via a monitor (e.g., a graphic user interface (GUI)), or other computer generated images. Non-natural video data can be created by capturing computer desktop screens, and thus, can have sharp edges, no noise, different spectral activity and spatial frequencies (e.g., text and graphics). Methods for fast motion estimation can have improved efficiency and lower computational complexity when taking into consideration the characteristics of non-natural video data. Further, a full search is computationally expensive and may not be feasible in certain applications.

Figure 5:
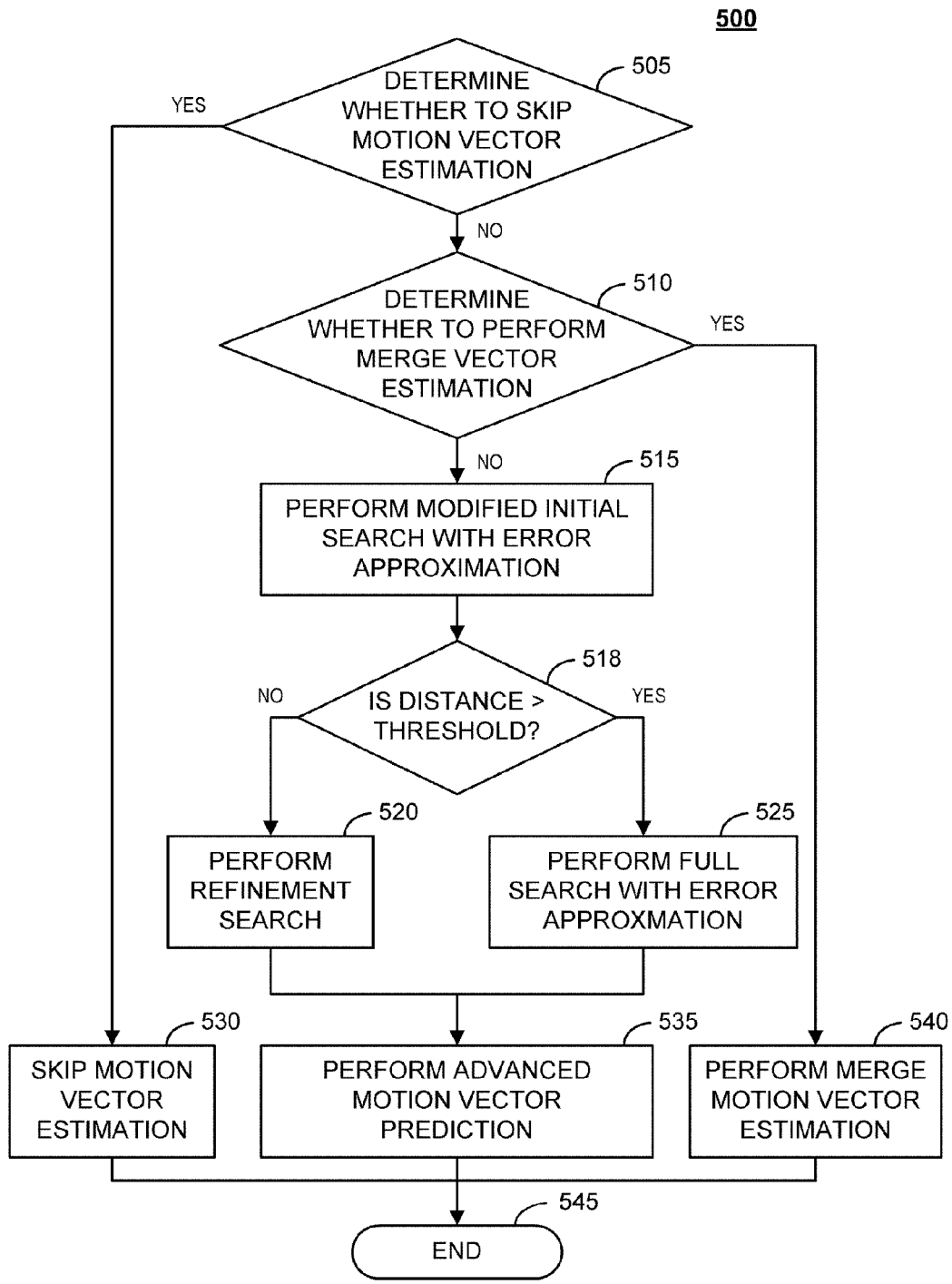
FIG. 5 is a flowchart illustrating another method for accelerated motion estimation in accordance with aspects described in this disclosure.

FIG. 5 is a flowchart illustrating a method for accelerated motion estimation in accordance with aspects described in this disclosure. The method 500 of FIG. 5 may have improved performance for fast motion estimation of non-natural video. Specifically, the motion estimation method 500 may be more suitable for capturing the spatial and temporal characteristics of non-natural video data. Non-natural video data may exhibit non-monotonic error surfaces and high spatial frequency characteristics which are contrary to the typical assumptions of fast motion estimation algorithms designed for natural video data.

The steps illustrated in FIG. 5 may be performed by a video encoder (e.g., the video encoder 20) or any other component. For convenience, method 500 is described as performed by a video coder (also simply referred to as coder), which may be the video encoder 20, the video decoder 30, or another component.

The method 500 begins at decision block 505, where the coder performs a modified determination of whether to skip motion vector estimation. The modified determination of whether to skip motion vector estimation of block 505 is modified with respect to block 405 of the conventional method 400 of FIG. 4. When the coder determines to skip motion estimation at decision block 505, the method 500 proceeds to block 530 where the coder skips motion estimation. At block 545, the method 500 ends. The modified determination of whether to skip motion vector estimation will be described in greater detail below.

When the coder determines to perform motion estimation at decision block 505, the method continues to decision block 510. At decision block 510, the coder determines whether to perform merge motion vector estimation. When the coder determines to performed merge vector estimation, the method 500 proceeds to block 540. At block 540, the coder performs merge motion vector estimation. The method then ends at block 545. When the coder determines not to perform merge motion vector estimation at decision block 510, the method 500 continues at block 515.

At block 515, the coder performs a modified initial search with error approximation. The modified initial search with error approximation of block 515 is modified with respect to block 415 of the method 400 of FIG. 4. At block 515, the modified initial search may be performed based on a predictor and will identify a candidate block as a best match, i.e., the candidate block having the lowest matching cost or lowest total matching cost with the current block. The coder then determines whether the distance between the best match to the current block is greater than the distance from the predictor to the current block. A more detailed explanation of the modified initial search will be described in greater detail below. At decision block 518, the difference in the distances between the best match and the predictor to the current block are compared to a threshold. When the difference in the distances between the best match and the predictor to the current block is greater than the threshold, the method 500 continues at block 525. When the difference in distances between the best match and the predictor to the current block is less than or equal to the threshold, the method 500 continues at block 520.

At block 520, the coder performs a refinement search. After the refinement search, the method 500 proceeds to block 535 where the coder performs AMVP. At block 525, the coder performs a full search with error approximation. A more detailed explanation of the full search with error approximation will be described in greater detail below. After the full search, the method ends at block 535 where the coder performs AMVP. After block 535, the method 500 ends at block 545.

Multi-Stage Approximated Cost Computation with Early Exits at Each Stage

As previously discussed, non-natural video data has sharp edges and high spatial frequencies compared to natural video data. As such, a large portion of the error in the cost computation for block matching is likely to be concentrated around on few samples. Thus, candidate blocks may be rejected as a best match for the current block based on approximated error computed from partial samples of a match between the candidate block and the current block.

Figure 6:
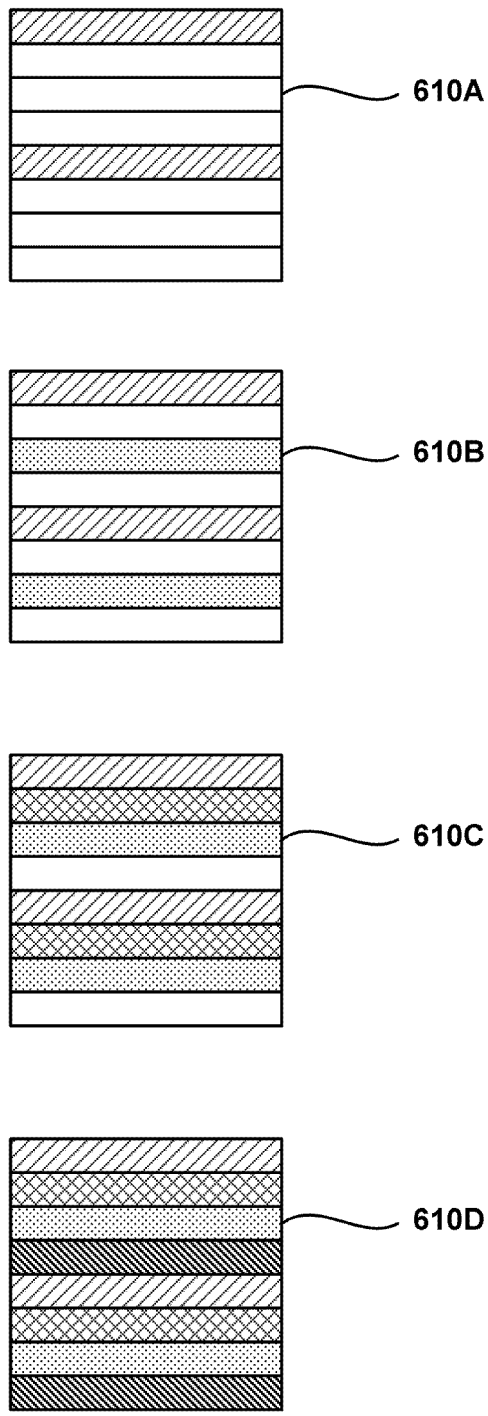
FIG. 6 is a block diagram illustrating partial samples of a candidate block that are matched to a current block in stages in accordance with aspects of this disclosure.

FIG. 6 is a block diagram illustrating partial samples of a candidate block that are matched to a current block in stages in accordance with aspects of this disclosure. The partial samples of the candidate block 610A, 610B, 610C, and 610D at different stages of the multi-stage approximated cost computation are illustrated by hatching in FIG. 6. Candidate block 610A illustrates the partial samples of the candidate block 610A that have been taken in a first stage of the approximated cost computation. In the FIG. 6 embodiment, the partial sample of the candidate block 610A is illustrated as two lines of the candidate block 610A, however, in other embodiments, the partial sample may be a single line, a plurality of lines, or at a finer granularity than one line of the candidate block 610A. Similarly, the candidate block 610B, 610C, and 610D illustrates the partial samples of the candidate block 610A taken in second, third, and fourth stages of the approximated cost computation. Although eight lines have been illustrated in the candidate block 610A to 610D of FIG. 6, the approximated cost computation method described herein can be adopted to match blocks of various sizes. Further, the method disclosed in connection with FIG. 6 is referred to herein as an approximated cost computation, however, a total cost may be computed including both an approximation of the error for matching the candidate block 610A to 610D to the current block as well as an associated cost for signaling the motion vector of the candidate block in the bitstream.

In some embodiments, the total cost of the candidate block 605 matching the current block is approximated based on the partial samples of the candidate block 605 and this approximated cost is used to decide the best candidate. The number of partial samples used for approximating the total cost of the blocks may vary according to the applications and implementation budget. In one implementation, the partial samples for two lines of the candidate block 605, shown by cross hatching in FIG. 6, are used. An estimate of the cost of matching the candidate block 605 to the current block is added to the partial samples to generate a total cost for matching the candidate block 605 to the current block.

In other implementations, the total cost is calculated in multiple stages with each stage refining the number of partial samples used. For example, the first stage may include samples of two lines as shown by the hatching in candidate block 605. In the second stage, samples for another two lines are added to the samples used in the first stage as shown in candidate block 610. Further refinements may be performed in third and fourth stages as illustrated by candidate block 615 and 620. The intermediate cost as computed at each stage can be used to decide whether to perform a further refinement of the approximated cost for matching the candidate block 605 to 620 to the current block by performing the next stage computation, thereby providing an early exit mechanism. In some implementations, when the approximated cost at any stage of the approximated cost computation is greater than the total cost of a previously identified best cost, the candidate block 605 to 620 is rejected.

For example, a first approximated total cost may be computed with 16 samples and if the first computed cost is less the previously identified best cost, then the cost can be computed in the next stage based on 32 samples. As the number of partial samples used in computing the approximated cost increases, the prevision of the approximation likewise increases.

In further embodiments, the motion vector bit cost (e.g., λ*mvbits) is added to the approximated cost to obtain the total cost. This is possible as the approximated total cost represents the total cost of the candidate block in contrast to traditional methods that calculate cost based on partial samples and do not represent the total cost of the candidate block.

For a block size of B×B, the approximated total cost based of T pixels for the block can be represented by below equation:

$$ECost_{(x,y)}^{l}(u, v) =$$
$$\sum_{j=0}^{B-1}\sum_{i=0}^{B-1}\sum_{m=0}^{l-1} |I_t(x + i(m), y + j(m)) - I_{t-1}(x + u + i(m), y + v + j(m))| +$$
$$Estimate + MV\ BitCost$$

Where $i(m), j(m)|m=0, 1, \ldots B^2-1$ is the index set of all the pixels in the candidate block.

The following pseudo-code illustrates an exemplary implementation of partial error approximation with early exit:

```
begin
for each (u,v) in the search range do
begin (initialization)
calculate ECost(u,v)
l:= L
end
while (l>0 && ECost_{(x,y)}^{l}(u,v) < BestCost) do
begin
calculate ECost_{(x,y)}^{l-1}(u,v))
end
output ECost_{(x,y)}^{l}(u,v)
end
```

Modified Initial Search

As previously discussed, non-natural video data may include non-monotonic error patterns. Accordingly, an exponentially expanding diamond as commonly used in the traditional motion estimation techniques may not be efficient as it may either miss one of the best candidates or falsely infer a best candidate to be near the best predictor. According to at least one embodiment, a uniform moving diamond pattern is employed with a smaller search area.

Figure 7:
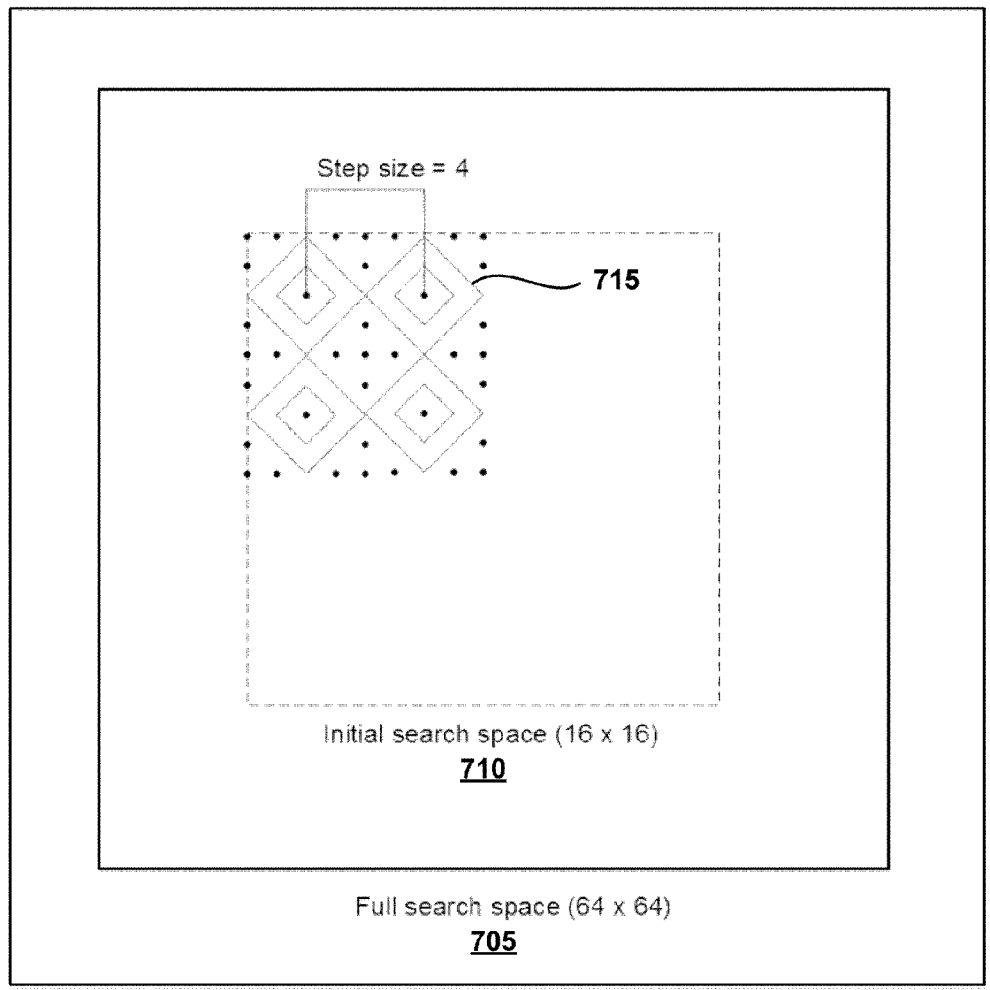
FIG. 7 is a diagram illustrating a modified initial search in accordance with aspects of this disclosure.

FIG. 7 is a diagram illustrating a modified initial search in accordance with aspects of this disclosure. As shown in FIG. 7, an example full search space 705 may be a 64×64 size search space. In the modified initial search, the search is performed within an initial search space 710 having a size of about 16×16. The diamond 715 may have a fixed size that traverses the initial space 710 horizontally and/or vertically. This may better capture the local minima for non-natural video data. The sizes of the search spaces described in connection with FIG. 7 are merely examples and the described technology is not limited thereto.

In certain implementations, the initial search space 710 that the fixed diamond 715 traverses is a smaller than or a portion of the full search space 705. In the FIG. 7 embodiment, the fixed diamond 715 traverses the initial search space 710 with a fixed step size of 4. As such, only a portion of the initial search space 710 is included within the modified initial search. In some embodiments, the distance between the best candidate from the initial search and the best predictor is used in determining whether to perform a refinement search or a full search with error approximation as discussed above in connection with FIG. 5.

Modified Early Skip Detection

In certain embodiments, such as in the HM range extension, the skip detection is based on when a residual signal of merge motion vector or when an absolute sum of the horizontal and vertical motion vectors are zero. However, the decision to skip motion vector estimation based on when an absolute sum of the horizontal and vertical motion vectors are zero may be too aggressive for non-natural video data and may not be efficient for animated images contained within non-natural video data which are closer to natural video data.

As such, in certain implementations, early skip detection, e.g., the determination of whether to skip motion vector estimation, is performed based only on the residual signal of the merge motion vector. When the residual signal of merge motion vector is zero, it is highly likely that the candidate block may not have high frequencies and therefore may be suitable to be skipped.

Example Flowchart for Motion Estimation of Non-Natural Video Data

Figure 8:
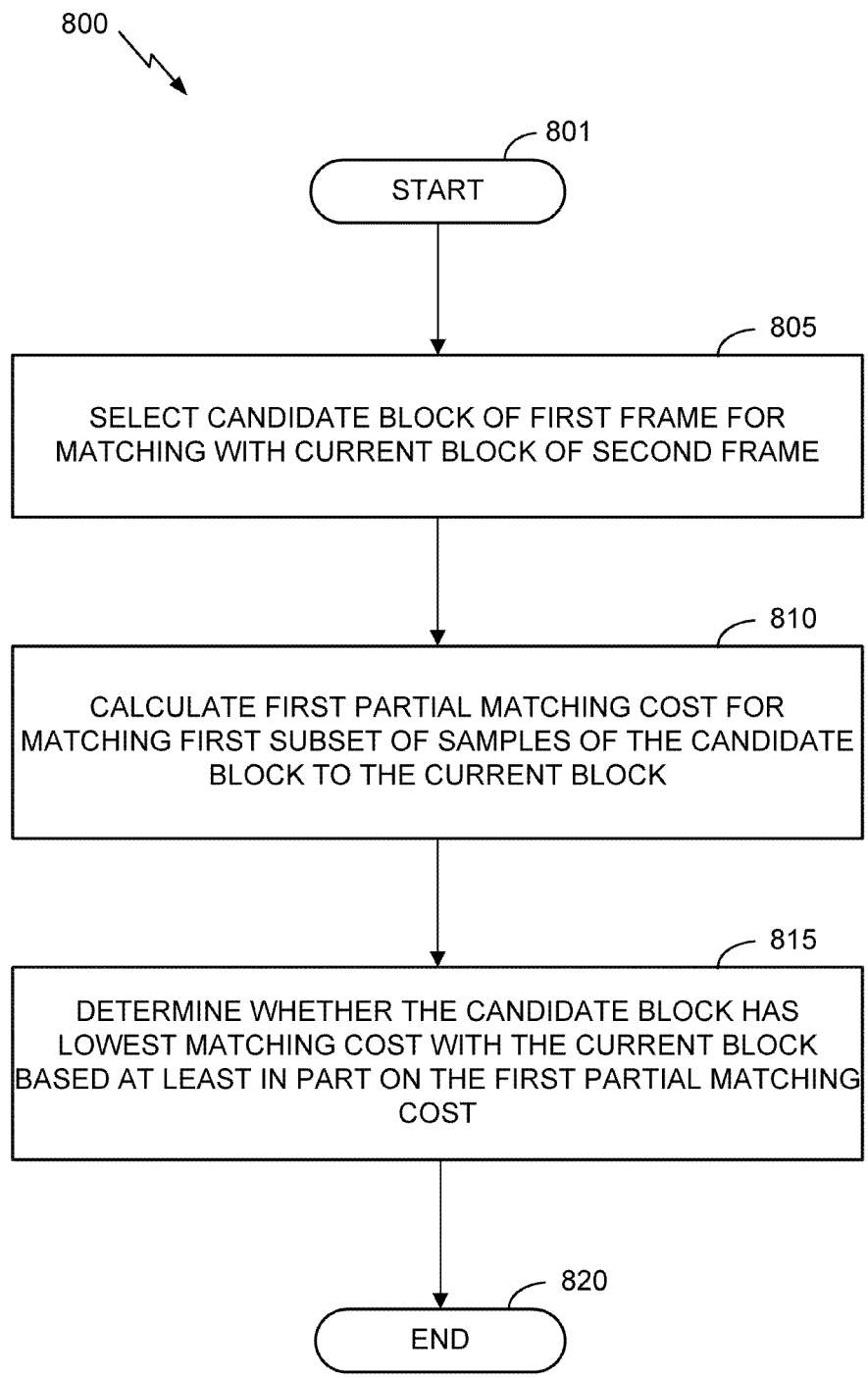
FIG. 8 is a flowchart illustrating a method for motion estimation in accordance with aspects of the present disclosure.

With reference to FIG. 8, an example procedure for motion estimation of non-natural video data will be described. FIG. 8 is a flowchart illustrating a method 800 for motion estimation in accordance with aspects of the present disclosure. The steps illustrated in FIG. 8 may be performed by a video encoder (e.g., the video encoder 20) or any other component. For convenience, method 800 is described as performed by a video coder (also simply referred to as coder), which may be the video encoder 20, or another component.

The method 800 begins at block 801. At block 805, the coder selects a candidate block of a first frame of the video data for matching with a current block of a second frame of the video data. The candidate block may be selected according to a modified initial search of an initial search area.

At block 810, the coder calculates a first partial matching cost for matching a first subset of the samples of the candidate block to the current block. The first partial matching cost may be a matching cost for matching a subset of the samples of the candidate block to the current block. The first matching partial cost may be used to calculate a total matching cost by summing the first partial matching cost also with an estimate of the cost for matching the remaining samples of the candidate block to the current block.

At block 815, the coder determines whether the candidate block has a lowest matching cost with the current block based at least in part on the first partial matching cost. For example, the coder may maintain a best match candidate block, e.g., a candidate block that has the lowest matching cost with the current block. In some implementations, when the candidate block has a lower first partial matching cost or total matching cost with the current block than the best match candidate block, the coder updates the best match candidate block to the candidate block. The method ends at block 820.

In the method 800, one or more of the blocks shown in FIG. 8 may be removed (e.g., not performed) and/or the order in which the method is performed may be switched. In some embodiments, additional blocks may be added to the method 800. The embodiments of the present disclosure are not limited to or by the example shown in FIG. 8, and other variations may be implemented without departing from the spirit of this disclosure.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method for motion estimation of non-natural video data, the method comprising:
    determining whether to skip motion estimation based only on a residual of a merge motion vector; and
    responsive to determining not to skip motion estimation:
    selecting a candidate block of a first frame of the non-natural video data for matching to a current block of a second frame of the non-natural video data, the candidate block being selected from a first diamond pattern surrounding a previous candidate block of the first frame of the non-natural video data, wherein the non-natural video data comprises computer-generated video data not captured through a camera having an optical system;
    obtaining a previously calculated lowest matching difference value based on matching the previous candidate block of the first frame of the non-natural video data to the current block of the second frame of the non-natural video data;
    calculating a first partial matching difference value of matching a first subset of samples of the candidate block to the current block;
    estimating, based on the first partial matching difference value, a total matching difference value of matching the candidate block to the current block;
    comparing the estimated total matching difference value of the candidate block to the lowest matching difference value of the previous candidate block;
    determining, based on the comparison, whether the candidate block does not have a lowest matching difference value to the current block; and
    selecting, in response to the candidate block not having the lowest matching difference value to the current block, a subsequent candidate block of the first frame of the non-natural video data for matching to the current block from a second diamond pattern that is at least one of horizontally or vertically displaced from the first diamond pattern.

2. The method of claim 1, further comprising:
    calculating an estimate of a matching difference value for matching the remaining samples of the candidate block to the current block based on the first partial matching difference value,
    wherein the estimated total matching difference value is further based on the estimate of the matching difference value for matching the remaining samples.

3. The method of claim 2, further comprising:
    calculating a second partial difference value for matching a second subset of the samples of the candidate block to the current block;
    updating the remaining samples of the candidate block by removing the second subset of samples of the candidate block;
    refining the estimate of the matching difference value for matching the remaining samples via calculating a refined estimate for matching the updated remaining samples of the candidate block to the current block;
    refining the estimated total matching difference value via summing the first partial difference value, the second partial difference value, and the refined estimate; and
    determining whether the candidate block has the lowest matching difference value to the current block based at least in part on the refined estimated total matching difference value.

4. The method of claim 3, further comprising:
    selecting a previous candidate block of the first frame of the non-natural video data for matching to the current block;
    calculating a previous total matching difference value for matching the previous candidate block to the current block;
    determining that the candidate block does not have the lowest matching difference value to the current block when the refined estimated total matching difference value is greater than the previous total matching difference value; and
    determining that the candidate block has the lowest matching difference value to the current block when the refined estimated total matching difference value is less than the previous total matching difference value.

5. The method of claim 2, further comprising calculating a motion vector bit value for matching the candidate block to the current block, wherein the estimating the total matching difference value further comprises summing the first partial difference value, the estimate of the matching difference value for matching the remaining samples, and the motion vector bit value.

6. The method of claim 1, further comprising performing a modified initial search, wherein the first and second diamond patterns are located within an initial search area that is a sub-portion of an entire search area.

7. The method of claim 1, further comprising:
    determining a first distance between the candidate having the lowest matching difference value and the current block;
    determining a second distance between a predictor and the current block; and
    determining whether to perform a refinement search or a full search with error approximation based on the difference between the first and second distances.

8. A device for motion estimation of non-natural video data, the device comprising:
    a memory configured to store the non-natural video data, the non-natural video data comprising video data not captured through a camera having an optical system; and
    a processor in communication with the memory and configured to:
    determine whether to skip motion estimation based only on a residual of a merge motion vector; and
    responsive to determining not to skip motion estimation:
    select, from a first diamond pattern surrounding a previous candidate block of a first frame of the non-natural video data, a candidate block of the first frame of the non-natural video data for matching to a current block of a second frame of the non-natural video data;
    obtain a previously calculated lowest matching difference value based on matching the previous candidate block of the first frame of the non-natural video data to the current block of the second frame of the non-natural video data;
    calculate a first partial matching difference value of matching a first subset of samples of the candidate block to the current block;

estimate, based on the first partial matching difference value, a total matching difference value of matching the candidate block to the current block;

compare the estimated total matching difference value of the candidate block to the lowest matching difference value of the previous candidate block;

determine whether the candidate block does not have a lowest matching difference value to the current block based on the comparison; and select, in response to the candidate block not having the lowest matching difference value to the current block and from a second diamond pattern that is at least one of horizontally or vertically displaced from the first diamond pattern, a subsequent candidate block of the first frame of the non-natural video data for matching to the current block.

9. The device of claim 8, wherein the processor is further configured to:

calculate an estimate of a matching difference value for matching the remaining samples of the candidate block to the current block, wherein estimating the total matching difference value is further based on the estimate of the matching difference value for matching the remaining samples.

10. The device of claim 9, wherein the processor is further configured to:

calculate a second partial difference value for matching a second subset of the samples of the candidate block to the current block;

update the remaining samples of the candidate block by removing the second subset of samples of the candidate block;

refine the estimate of the matching difference value for matching the remaining samples via calculating a refined estimate for matching the updated remaining samples of the candidate block to the current block;

refine the estimated total matching difference value via summing the first partial difference value, the second partial difference value, and the refined estimate; and determine whether the candidate block has the lowest matching difference value to the current block based at least in part on the refined estimated total matching difference value.

11. The device of claim 10, wherein the processor is further configured to:

select a previous candidate block of the first frame of the non-natural video data for matching to the current block;

calculate a previous total matching difference value for matching the previous candidate block to the current block;

determine that the candidate block does not have the lowest matching difference value to the current block when the refined estimated total matching difference value is greater than the previous total matching difference value; and determine that the candidate block has the lowest matching difference value to the current block when the refined estimated total matching difference value is less than the previous total matching difference value.

12. The device of claim 9, wherein the processor is further configured to:

calculate a motion vector bit value for matching the candidate block to the current block, estimate the total matching difference value via summing the first partial difference value, the estimate of the matching difference value for matching the remaining samples, and the motion vector bit value.

13. The device of claim 8, wherein the processor is further configured to perform a modified initial search, wherein the first and second diamond patterns are located within an initial search area that is a sub-portion of an entire search area.

14. An apparatus for motion estimation of non-natural video data, comprising:

means for determining whether to skip motion estimation based only on a residual of a merge motion vector;

means for selecting, from a first diamond pattern surrounding a previous candidate block of a first frame of the non-natural video data, a candidate block of the first frame of the non-natural video data for matching to a current block of a second frame of the non-natural video data, wherein the non-natural video data comprises video data not captured through a camera having an optical system;

means for obtaining a previously calculated lowest matching difference value based on matching the previous candidate block of the first frame of the non-natural video data to the current block of the second frame of the non-natural video data;

means for calculating a first partial matching difference value for matching a first subset of samples of the candidate block to the current block;

means for estimating, based on the first partial matching difference value, a total matching difference value of matching the candidate block to the current block;

means for comparing the estimated total matching difference value of the candidate block to the lowest matching difference value of the previous candidate block;

means for determining whether the candidate block does not have a lowest matching difference value to the current block based on the comparison; and means for selecting, in response to the candidate block not having the lowest matching difference value to the current block and from a second diamond pattern that is at least one of horizontally or vertically displaced from the first diamond pattern, a subsequent candidate block of the first frame of the non-natural video data for matching to the current block.

15. The apparatus of claim 14, further comprising:

means for calculating an estimate of a matching difference value for matching the remaining samples of the candidate block to the current block, wherein estimating the total matching difference value is further based on the estimate of the matching difference value for matching the remaining samples.

16. The apparatus of claim 15, further comprising:

means for calculating a second partial difference value for matching a second subset of the samples of the candidate block to the current block;

means for updating the remaining samples of the candidate block by removing the second subset of samples of the candidate block;

means for refining the estimate of the matching difference value for matching the remaining samples via calculating a refined estimate for matching the updated remaining samples of the candidate block to the current block;

means for refining the estimated total matching difference value via summing the first partial difference value, the second partial difference value, and the refined estimate; and means for determining whether the candidate block has the lowest matching difference value to the current block based at least in part on the refined estimated total matching difference value.

17. The apparatus of claim 16, further comprising:
means for selecting a previous candidate block of the first frame of the non-natural video data for matching to the current block;
means for calculating a previous total matching difference value for matching the previous candidate block to the current block;
means for determining that the candidate block does not have the lowest matching difference value to the current block when the refined estimated total matching difference value is greater than the previous total matching difference value; and
means for determining that the candidate block has the lowest matching difference value to the current block when the refined estimated total matching difference value is less than the previous total matching difference value.

18. The apparatus of claim 15, further comprising means for calculating a motion vector bit value for matching the candidate block to the current block, wherein the means for estimating the total matching difference value further comprises means for summing the first partial difference value, the estimate of the matching difference value for matching the remaining samples, and the motion vector bit value.

19. The apparatus of claim 14, further comprising means for performing a modified initial search, wherein the first and second diamond patterns are located within an initial search area that is a sub-portion of an entire search area.

20. A non-transitory computer readable storage medium having stored thereon instructions that, when executed, cause a processor of a device configured for motion estimation of non-natural video data to:
determine whether to skip motion estimation based only on a residual of a merge motion vector;
select, from a first diamond pattern surrounding a previous candidate block of a first frame of the non-natural video data, a candidate block of the first frame of the non-natural video data for matching to a current block of a second frame of the non-natural video data, wherein the non-natural video data comprises video data not captured through a camera having an optical system;
obtain a previously calculated lowest matching difference value based on matching the previous candidate block of the first frame of the non-natural video data to the current block of the second frame of the non-natural video data;
calculate a first partial matching difference value for matching a first subset of samples of the candidate block to the current block;
estimate, based on the first partial matching difference value, a total matching difference value of matching the candidate block to the current block;
compare the estimated total matching difference value of the candidate block to the lowest matching difference value of the previous candidate block;
determine whether the candidate block does not have a lowest matching difference value to the current block based on the comparison; and
in response to the candidate block not having the lowest matching difference value to the current block, select, from a second diamond pattern that is at least one of horizontally or vertically displaced from the first diamond pattern, a subsequent candidate block of the first frame of the non-natural video data for matching to the current block.

21. The non-transitory computer readable storage medium of claim 20, further having stored thereon instructions that, when executed, cause the processor to:
calculate an estimate of a matching difference value for matching the remaining samples of the candidate block to the current block,
wherein estimating the total matching difference value is further based on the estimate of the matching difference value for matching the remaining samples.

22. The non-transitory computer readable storage medium of claim 21, further having stored thereon instructions that, when executed, cause the processor to:
calculate a second partial difference value for matching a second subset of the samples of the candidate block to the current block;
update the remaining samples of the candidate block by removing the second subset of samples of the candidate block;
refine the estimate of the matching difference value for matching the remaining samples via calculating a refined estimate for matching the updated remaining samples of the candidate block to the current block;
refine the estimated total matching difference value via summing the first partial difference value, the second partial difference value, and the refined estimate; and
determine whether the candidate block has the lowest matching difference value to the current block based at least in part on the refined estimated total matching difference value.

23. The non-transitory computer readable storage medium of claim 22, further having stored thereon instructions that, when executed, cause the processor to:
select a previous candidate block of the first frame of the non-natural video data for matching to the current block;
calculate a previous total matching difference value for matching the previous candidate block to the current block;
determine that the candidate block does not have the lowest matching difference value to the current block when the refined estimated total matching difference value is greater than the previous total matching difference value; and
determine that the candidate block has the lowest matching difference value to the current block when the refined estimated total matching difference value is less than the previous total matching difference value.

24. The non-transitory computer readable storage medium of claim 21, further having stored thereon instructions that, when executed, cause the processor to:
calculate a motion vector bit value for matching the candidate block to the current block, estimate the total matching difference value via summing the first partial difference value, the estimate of the matching difference value for matching the remaining samples, and the motion vector bit value.

25. The non-transitory computer readable storage medium of claim 20, further having stored thereon instructions that, when executed, cause the processor to perform a modified initial search, wherein the first and second diamond patterns are located within an initial search area that is a sub-portion of an entire search area.

26. The method of claim 1, wherein the second diamond pattern and the first diamond pattern are the same size.

27. The method of claim 26, wherein the second diamond pattern is displaced from the first diamond pattern with a step size of four.

28. The device of claim 8, wherein the second diamond pattern and the first diamond pattern are the same size.

29. The device of claim 28, wherein the second diamond pattern is displaced from the first diamond pattern with a step size of four.

30. A device for motion estimation of non-natural video data, the device comprising:
- a memory configured to store the non-natural video data, the non-natural video data comprising video data not captured through a camera having an optical system; and
- a processor in communication with the memory and configured to:
  - select, from a first diamond pattern surrounding a previous candidate block of a first frame of the non-natural video data, a candidate block of the first frame of the non-natural video data for matching to a current block of a second frame of the non-natural video data;
  - obtain a previously calculated lowest matching difference value based on matching the previous candidate block of the first frame of the non-natural video data to the current block of the second frame of the non-natural video data;
  - calculate a first partial matching difference value of matching a first subset of samples of the candidate block to the current block;
  - estimate, based on the first partial matching difference value, a total matching difference value of matching the candidate block to the current block;
  - compare the estimated total matching difference value of the candidate block to the lowest matching difference value of the previous candidate block;
  - determine whether the candidate block does not have a lowest matching difference value to the current block based on the comparison;
  - select, in response to the candidate block not having the lowest matching difference value to the current block and from a second diamond pattern that is at least one of horizontally or vertically displaced from the first diamond pattern, a subsequent candidate block of the first frame of the non-natural video data for matching to the current block;
  - determine a first distance between the candidate having the lowest matching difference value and the current block;
  - determine a second distance between a predictor and the current block; and
  - determine whether to perform a refinement search or a full search with error approximation based on the difference between the first and second distances.

* * * * *